W. H. STOCKHAM.
SPLIT PULLEY.
APPLICATION FILED AUG. 25, 1908.
948,080.
Patented Feb. 1, 1910.
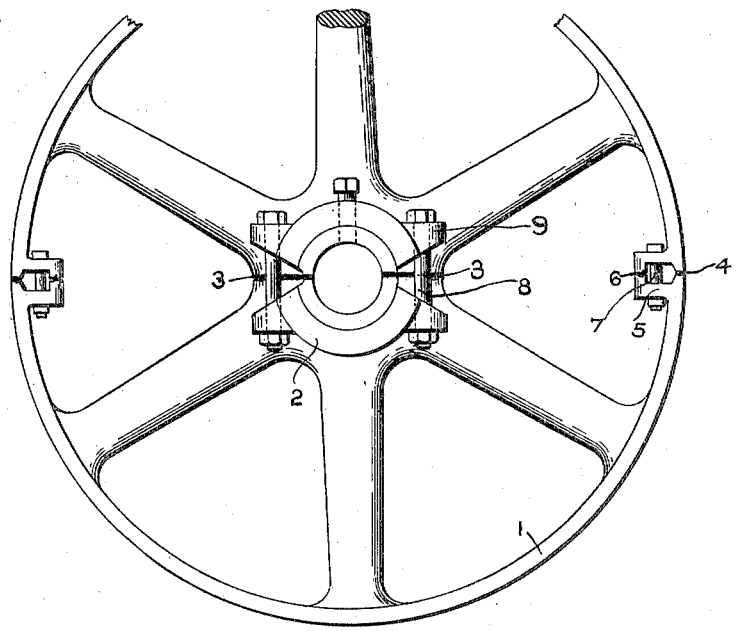
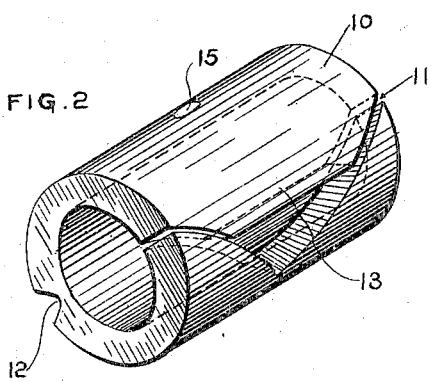
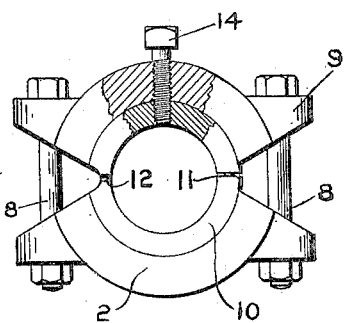
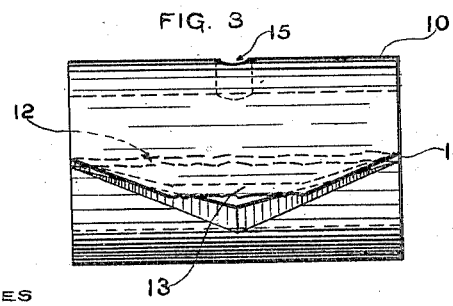
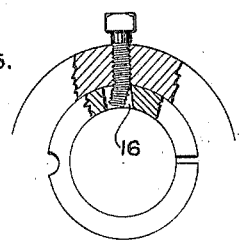
WITNESSES
INVENTOR
WM. H. STOCKHAM.
BY
R. H. Johnston Jr.
ATTORNEY.

UNITED STATES PATENT OFFICE.

WILLIAM H. STOCKHAM, OF BIRMINGHAM, ALABAMA, ASSIGNOR TO SCHAEFER MANUFACTURING COMPANY, OF BIRMINGHAM, ALABAMA, A CORPORATION OF ALABAMA.

SPLIT PULLEY.

948,080.  Specification of Letters Patent.  Patented Feb. 1, 1910.

Application filed August 25, 1908. Serial No. 450,240.

*To all whom it may concern:*

Be it known that I, WILLIAM H. STOCKHAM, a citizen of the United States, residing at Birmingham, in the county of Jefferson and State of Alabama, have invented new and useful Improvements in Split Pulleys, of which the following is a specification.

My invention relates to an improvement in split pulleys and more particularly to the provision of a novel form of split bushing for use in connection with a split pulley.

It is the principal object of my invention to form the bushing so that it can be machined as a whole and when split there will be no practical necessity for filing down the sections of the bushing as is required with split bushings now in use. The objection to this filing, in addition to the expense and time required, is that if either section is not filed sufficiently to cause the sections of the bushing to grip the shaft, the pulley will invariably work loose. According to my invention the bushing is formed with a longitudinal kerf or slot which extends its whole length, and is positioned opposite a weakened portion or cleavage line. The width of the kerf or slot is made greater than the excess of the internal circumference of the bushing before fracture over the circumference of the shaft upon which it is to be applied. Obviously therefore, when the bushing is split and assembled the sides of the kerf will meet, giving the correct internal circumference to insure a tight fit on the shaft.

A further object of my invention is to form the kerf or slot V-shaped so that the sections of the pulley will interlock against longitudinal displacement and will, under pressure, adjust themselves to their correct relative positions. By the provision of the longitudinal kerf I am enabled to split the bushing by a stroke of a hammer at a point between the kerf and cleavage line.

My invention comprises the foregoing and other novel features of construction, which are hereinafter more fully explained, reference being had to the accompanying drawings, in which:—

Figure 1 illustrates the side view of a pulley equipped with my improved bushing. Fig. 2 is an enlarged perspective detail view of the bushing before being split. Fig. 3 is a side view of Fig. 2. Fig. 4 is an end view of the pulley hub with the bushing locked in position and illustrating my improved set screw construction. Fig. 5 illustrates the present defective set screw arrangement in common use.

Similar reference numerals refer to similar parts throughout the drawings.

According to my invention in the drawings I provide a split pulley having a rim 1 and a hub 2 which is suitably weakened at 3 so that the hub, which is cast integral, may be broken along the weakened portions of cleavage lines. In the plane with the weakened portions 3 I provide a transverse groove or weakened cleavage line 4 at diametrically opposite points on the rim and cast the rim with internal flanges or lugs 5 which join at their ends and are adapted to be broken at 6 in a plane in line with the cleavage lines 3 and 4. The rim portions are adapted to be fastened together by bolts 7 which pass through the lugs 5. Bolts 8 pass through bolting lugs 9 cast integral with the hub and disposed on each side of the cleavage lines 3, these bolts 7 and 8 serving to draw the sections of the wheel together until it constitutes practically an integral body.

To adapt pulleys of this type to fit shafts of varying diameter, each pulley of a given size is provided with detachable and interchangeable bushings, such as 10, which have the same external but varying internal diameters, the bushings being cylindrical in their inner and outer surfaces. As formed, the bushings for use in connection with the shaft of a given diameter is turned with a slightly larger internal diameter than the diameter of the shaft and is provided with a kerf or slot 11 which is cut in from each side of the bushing at an angle to form a V-shaped slot or kerf, the cut extending entirely across the length of the bushing, and the width of the kerf being greater than the excess internal circumference which the bushing has over the shaft with which it will be used. Substantially diametrically opposite the points where the edges of the kerf enter the ends of the bushing, I provide a straight groove or weakened cleavage line 12 which extends lengthwise of the bushing. To prevent the half of the bushing having the V-shaped extension 13 from exceeding a curve of 180° or semi-circle to such an extent that such half section can not be sprung over the shaft, I cut away the apex of the portion 13, leaving a triangular opening. The bushing, however, may be cast with this opening and the kerfs cut in to meet same. No special breaking tool is required to part the bushing into sections by breaking it along the cleavage lines 12, as this can be accomplished by striking the bushing with a hammer at a point between the kerf and cleavage line. When this is broken the upper section of the bushing, as illustrated, is sprung over the shaft and holds itself in place. After this the lower section is then placed around the shaft and joined to the upper section, it being noted that no filing of the broken edges of the sections is necessary since the edges of the bushing sections, formed by the kerf 11, will under these conditions approach each other sufficiently, as seen in Fig. 4, thereby taking up the slight excess of internal circumference over the shaft so that the bolts 8, as they draw the sections of the hub around the bushing, hold the sections of the latter in tight and perfect engagement with the shaft.

The V-shaped kerf 11 with its diverging portions should be very obtuse, it only being necessary to give the same sufficient angular disposition so that when the sections of the bushing are forced together these diverging portions will by wedging action tend to adjust the sections until the apex of the portion 13, is forced into the corresponding apex of the recess, thus interlocking the sections and at the same time adjusting them to proper relative position.

An additional advantage of the V-shaped engagement of the bushing sections is to prevent their lateral displacement after the hub has once been bolted around them. This forms a practical and effective lock to hold the bushing sections together.

To secure the bushing in place in the pulley hub, I provide a set screw 14 which passes through a threaded opening in one of the hub sections and is adapted to be forced through a smooth opening 15 in one of the bushing sections. By making this opening of slightly smaller diameter than the set screw, the latter will have to force its way through to reach the shaft, and in so doing it becomes practically integral with the bushing. The advantages of this construction over the large opening 16, as seen in Fig. 5, which is in common use, will be obvious.

The cleavage line 12, in practice, may be positioned diametrically opposite the ends of the kerf or opposite a horizontal line bisecting the sides of the portion 13. Also the angle of the V-shaped kerf may be varied and the sides may lead into an opening not necessarily triangular, the essential feature in this connection being that the smooth sides of the bushing sections should meet in planes at such angles as to cause the sections to be locked together.

Having thus described my invention, what I claim as new and desire to secure by Letters Patent, is:—

The combination with a split pulley, of a bushing therefor formed of a cylindrical metal body weakened in a longitudinal line at one point and longitudinally slotted at a substantially diametrically opposite point, said slot forming a V-shaped kerf, the apex of the V-shaped extension on one section of the bushing being cut away, as and for the purpose described.

In testimony whereof I have hereunto set my hand in presence of two subscribing witnesses.

WILLIAM H. STOCKHAM.

Witnesses:
R. D. JOHNSTON, Jr.,
NOMIE WALSH.